Figure 1:
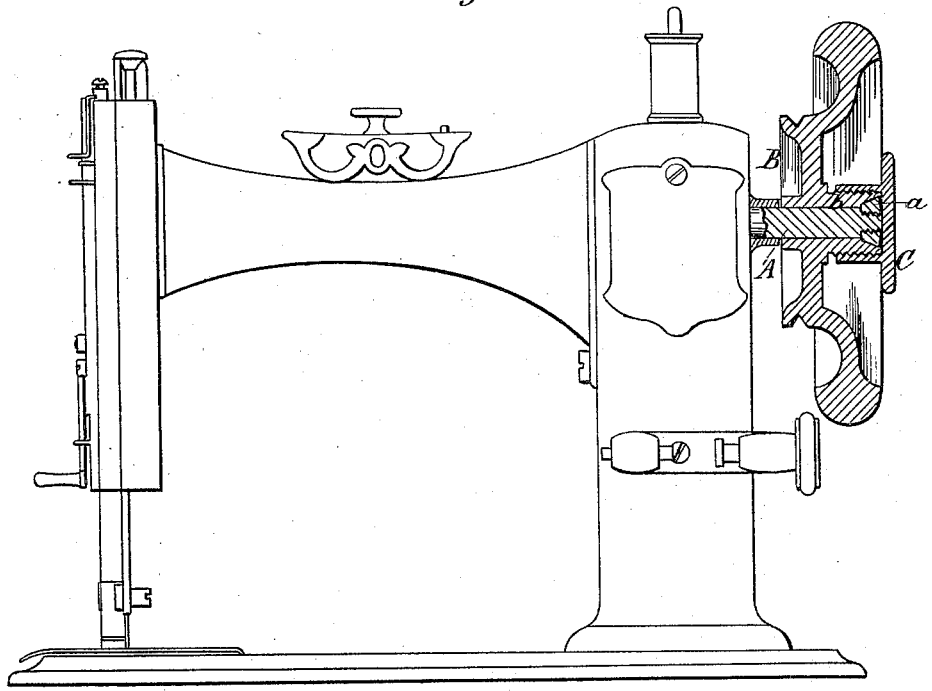

J. F. BOURN.
Device for Controlling the Fly Wheels of Sewing Machines.

No. 232,929. Patented Oct. 5, 1880.

Witnesses:
Philip F. Larner.
Howell Bartle.

Inventor:
John F. Bourn.
By McOmod
Attorney.

UNITED STATES PATENT OFFICE.

JOHN F. BOURN, OF PROVIDENCE, ASSIGNOR OF ONE-HALF OF HIS RIGHT TO AUGUSTUS O. BOURN, OF BRISTOL, RHODE ISLAND.

DEVICE FOR CONTROLLING THE FLY-WHEELS OF SEWING-MACHINES.

SPECIFICATION forming part of Letters Patent No. 232,929, dated October 5, 1880.

Application filed November 28, 1879.

*To all whom it may concern:*

Be it known that I, JOHN F. BOURN, of the city and county of Providence, in the State of Rhode Island, have invented a certain new and useful Improvement in Devices for Controlling the Fly-Wheels of Sewing-Machines; and I do hereby declare that the following specification, taken in connection with the drawings furnished, and forming a part of the same, is a clear, true, and complete description of my invention.

My improvement relates to means for rotatively connecting and disconnecting the pulley fly-wheel and the driving-shaft, so that a bobbin-winder may be operated by said wheel while said shaft is stationary. I employ for this purpose a wheel having a threaded hub, and a hand-nut fitted to said hub, as heretofore; but instead of using a hand-nut which is frictionally engaged with the driving-shaft, or rather with a conical collar thereon, for connecting the fly-wheel and shaft, I employ a conical bearing on the driving-shaft, which engages frictionally with the interior of the hub of the wheel, which is provided with a tapering recess to receive the conical bearing, the nut serving as a medium for drawing or forcing the wheel and conical bearing into operative union, and for readily allowing them to separate when desired. By having the frictional engagement between the hub of the wheel and the conical bearing the hand-nut is not unduly tightened during the running of the machine in sewing, as is liable to be the case when the frictional engagement is had between the nut and collar.

I am well aware that it is not new to combine a tapered journal, a wheel having a correspondingly-chambered hub, and a hand-nut on the shaft for forcing the wheel upon the conical journal, and such a combination is shown in English Letters Patent No. 1,610, of A. D. 1875; but I do not employ a tapered or conical journal, because therewith a constant friction occurs between the outer end of the wheel-hub and the nut, when the wheel is driven loosely upon said journal.

In my combination the journal is straight; but at either end thereof I provide a conical bearing, against which the wheel is forced or drawn, as may be preferred.

My invention consists in the combination, with a driving-shaft having a straight journal, and provided at either end of said journal with a conical bearing, of a fly and pulley wheel having a threaded hub recessed to receive said straight journal and its conical bearing, and a hand-nut fitted to the threaded hub, which forces the hub and conical bearing into frictional engagement; and to more particularly describe the same I will refer to the accompanying drawings, in which—

Figure 2:
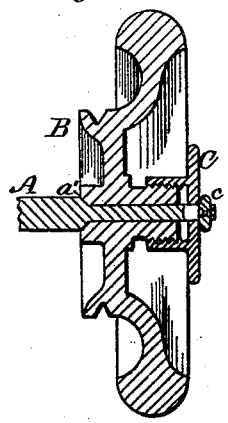

Figure 1 represents, in side view, a sewing-machine provided with my improvement in its preferred form, the balance-wheel and nut being shown in section. Fig. 2 represents, in section, a driving-shaft, fly and pulley wheel, and hand-nut embodying a modification of my invention.

The driving-shaft A is provided with a straight journal and a conical bearing. In Fig. 1 this bearing is a collar in the form of a frustum of a cone, $a$, applied to the outer end of the shaft, which is reduced in diameter and threaded to receive the collar, which is threaded internally after the manner of a nut, and provided with recesses on its outer face for the application of a pin-wrench for firmly seating it on the shaft. The thread on the shaft is so cut with reference to the direction in which the shaft is driven that the collar will be liable to be tightened thereon. The pulley and fly wheel B is rotatively mounted on the shaft, and has a hub, $b$, threaded externally, to receive the hand-nut C, which is recessed, threaded, and fitted so that on being turned in one direction upon the hub independently of the wheel it will take bearing against the end of the shaft and draw the wheel into firm rotative union with the conical collar, and on being turned in the opposite direction it will allow the wheel to revolve independently of the shaft. The conical collar on its outer face is slightly convex, so that the nut will take bearing closely adjacent to the center of the shaft, which may also be slightly convex, so as to reduce the area of contact as far as possible.

The modification shown in Fig. 2 illustrates the application of my invention to a driving-shaft, on which the conical bearing $a'$ is formed by reducing the size of the shaft near its end, obviating the use of a separate conical collar. The interior conical recess is at the inner end of the hub, instead of at the outer end.

The hub of the wheel and the interior of the hand-nut are threaded, as before described; but instead of drawing the wheel into contact with the conical bearing the wheel is pushed by the hand-nut toward said bearing, the nut having an abutment closely adjacent to the shaft in a small pin, $c$, firmly attached to said shaft within a slot at or near its outer end.

It is obvious that, so far as the action of the nut is concerned, it is immaterial whether the wheel is pushed or drawn into frictional engaging contact with the conical bearing, although I prefer the construction shown in Fig. 1, because therein the end of the shaft is fully housed and has no oil-surface exposed, as in Fig. 2, between the nut and pin.

In both forms of construction the hand-nut takes bearing closely adjacent to the shaft, and in case the needle is driving hard in sewing, or in case a needle breaks and the blunt end thereof should occasion a series of pounding shocks before the machine could be stopped, the nut would not be liable to be unduly tightened on the hub, because the frictional driving contact is between the wheel and the shaft, or a collar thereon, instead of between the shaft and the nut, as heretofore.

So, also, in both forms of construction is a straight journal employed, and it will be seen that with both forms, as soon as the nut is loosened, the wheel can freely revolve on its journal, with no tendency whatever to engage with undue friction with the conical bearing or with the nut, however the latter may be applied, as is the case when the journal itself is conical, as heretofore.

Having thus described my invention, I claim as new—

The combination, with a driving-shaft having a straight journal and a conical bearing, of a fly and pulley wheel having a threaded hub fitted to receive said journal and bearing, and a hand-nut fitted to engage with the threaded hub for forcing said wheel and its shaft into rotative union, substantially as described.

JOHN F. BOURN.

Witnesses:
GEORGE N. BLISS,
EDWIN C. PIERCE.